United States Patent [19]

Shelestak et al.

[11] Patent Number: 5,830,812

[45] Date of Patent: Nov. 3, 1998

[54] INFRARED AND ULTRAVIOLET RADIATION ABSORBING GREEN GLASS COMPOSITION

[75] Inventors: Larry J. Shelestak, Bairdford; Andrew Calabrese, Wexford, both of Pa.

[73] Assignee: PPG Industries, Inc., Pittsburgh, Pa.

[21] Appl. No.: 800,083

[22] Filed: Feb. 12, 1997

Related U.S. Application Data

[63] Continuation-in-part of Ser. No. 627,714, Apr. 1, 1996, abandoned.

[51] Int. Cl.$^6$ .................................................... C03C 3/087
[52] U.S. Cl. ................................................ 501/71; 501/70
[58] Field of Search .......................................... 501/70, 71

[56] References Cited

U.S. PATENT DOCUMENTS

| | | |
|---|---|---|
| 1,637,439 | 8/1927 | Coblentz . |
| 1,936,231 | 11/1933 | Gelsharp et al. . |
| 2,444,976 | 7/1948 | Brown . |
| 2,524,719 | 10/1950 | Tillyer . |
| 2,860,059 | 11/1958 | Molter et al. . |
| 2,974,052 | 3/1961 | Bacon et al. . |
| 2,991,185 | 7/1961 | Smith et al. . |
| 3,332,790 | 7/1967 | Penberthy . |
| 3,652,303 | 3/1972 | Janakirama Rao . |
| 3,779,733 | 12/1973 | Janakirama-Rao . |
| 3,873,329 | 3/1975 | Beall . |
| 4,042,405 | 8/1977 | Krohn et al. .............................. 106/52 |
| 4,381,934 | 5/1983 | Kunkle et al. ............................. 65/135 |
| 4,551,161 | 11/1985 | Savolskis et al. .......................... 65/27 |
| 4,701,425 | 10/1987 | Baker et al. ............................... 501/70 |
| 4,792,536 | 12/1988 | Pecoraro et al. ........................... 501/70 |
| 4,886,539 | 12/1989 | Cerutti et al. ............................. 65/135 |
| 5,013,487 | 5/1991 | Cheng ..................................... 252/587 |
| 5,069,826 | 12/1991 | Cheng ..................................... 252/587 |
| 5,077,133 | 12/1991 | Cheng ..................................... 428/426 |
| 5,112,778 | 5/1992 | Cheng et al. .............................. 501/31 |
| 5,214,008 | 5/1993 | Beckwith et al. .......................... 501/69 |
| 5,240,886 | 8/1993 | Gulotta et al. ............................ 501/70 |
| 5,318,931 | 6/1994 | Nakaguchi et al. ........................ 501/64 |
| 5,320,986 | 6/1994 | Taniguchi ................................. 501/70 |
| 5,344,798 | 9/1994 | Morimoto et al. ......................... 501/70 |
| 5,346,768 | 9/1994 | Winter et al. ............................. 428/426 |
| 5,362,689 | 11/1994 | Morimoto et al. ......................... 501/70 |
| 5,385,872 | 1/1995 | Gulotta et al. ............................ 501/71 |
| 5,411,922 | 5/1995 | Jones ...................................... 501/71 |
| 5,446,007 | 8/1995 | Krashkevich et al. ...................... 501/64 |
| 5,545,596 | 8/1996 | Casariego et al. ......................... 501/71 |
| 5,582,455 | 12/1996 | Casariego et al. ......................... 501/71 |
| 5,593,929 | 1/1997 | Krumwiede et al. ....................... 501/70 |
| 5,656,559 | 8/1997 | Combes et al. ........................... 501/70 |
| 5,688,727 | 11/1997 | Shelestak et al. ......................... 501/71 |

FOREIGN PATENT DOCUMENTS

| | | |
|---|---|---|
| 0 469 446 | 2/1992 | European Pat. Off. . |
| 488 110 | 6/1992 | European Pat. Off. . |
| 555 552 | 8/1993 | European Pat. Off. . |
| 0 598 305 | 5/1994 | European Pat. Off. . |
| 0 709 344 | 5/1996 | European Pat. Off. . |
| 527 487 | 11/1996 | European Pat. Off. . |
| 0 745 566 | 12/1996 | European Pat. Off. . |
| 0 748 776 | 12/1996 | European Pat. Off. . |
| 4313215 | 10/1993 | Germany . |
| 60-215546 | 10/1985 | Japan . |
| 61-136936 | 6/1986 | Japan . |
| 4-187539 | 7/1992 | Japan . |
| 4-310539 | 11/1992 | Japan . |
| 6-56466 | 3/1994 | Japan . |
| 96097 | 5/1978 | Poland . |
| 948912 | 8/1982 | U.S.S.R. . |
| WO91/07356 | 12/1990 | WIPO . |
| WO91/11042 | 8/1991 | WIPO . |
| WO91/11402 | 8/1991 | WIPO . |
| WO93/02019 | 4/1993 | WIPO . |
| WO94/18135 | 8/1994 | WIPO . |
| WO94/25407 | 11/1994 | WIPO . |
| WO96/00194 | 1/1996 | WIPO . |
| WO96/28394 | 9/1996 | WIPO . |

OTHER PUBLICATIONS

*Color Characteristics of Ultraviolet Absorbing Emerald Green Glass,* Ceramic Bulletin, vol. 47, No. 3 (1968), pp. 244–247, by R. C. Knupp et al. No Month.

Glass Science and Technology, 7, *Chemical Approach to Glass* by Milos B. Volf (1984), pp. 334–339. No Month.

The Glass Industry, *Ultraviolet–Absorbing Green Glass* presented at the Pacific Coast Regional Meeting, American Ceramic Society on Oct. 1963 (May 1964), pp. 244–248.

The Glass Industry, *Effects of Iron in Ultraviolet Absorbing Green Glass,* by R. C. Knupp et al. (May 1966), pp. 252–256, 279, 281.

Glass Science and Technology, 2, *Colour Generation and Control in Glass* (1977) by C. R. Bamford, pp. 45–48. No month.

*Primary Examiner*—Karl Group
*Attorney, Agent, or Firm*—Andrew C. Siminerio

[57] ABSTRACT

The present invention provides a green colored glass using a standard soda-lime-silica glass base composition and additionally iron, cerium, chromium and, optionally, titanium as infrared and ultraviolet radiation absorbing materials and colorants. It is preferred that the glass have a green color characterized by a dominant wavelength in the range of about 500 to 565 nanometers with an excitation purity of no higher than about 5% and include about 0.50 to 1.0 wt. % total iron, about 0.26 to 0.65 wt. % $Fe_2O_3$, about 0.05 to 3 wt. % $CeO_2$, 0 to about 2 wt. % $TiO_2$, and about 20 to 650 PPM $Cr_2O_3$. The redox ratio for the glass is maintained between about 0.20 to 0.55. The glass compositions disclosed in the present invention have an LTA of at least about 65%, preferably at least 70%, a TSUV of no greater than 38%, preferably no greater than 35%, a TSIR of no greater than about 35%, preferably no greater than about 30%, and a TSET of no greater than about 50%, preferably, no greater than about 48%. In addition, the glass preferably has an ISO UV of no greater than about 15%, preferably no greater than about 10%,

50 Claims, No Drawings

INFRARED AND ULTRAVIOLET RADIATION ABSORBING GREEN GLASS COMPOSITION

This is a continuation in part application of U.S. patent application Ser. No. 08/627,714, filed Apr. 1, 1996 now abandoned.

BACKGROUND OF THE INVENTION

This invention involves a green colored soda-lime-silica glass composition having a luminous transmittance that makes it highly desirable for use in vision areas of a vehicle, such as a windshield and side and rear windows. In particular, the glass has a luminous transmittance of 65% or greater, preferably 70% or greater. In addition, the glass of the present invention generally exhibits lower infrared and ultraviolet radiation transmittance when compared to typical green glasses used in automotive applications. The glass is also compatible with flat glass manufacturing methods.

Various infrared and ultraviolet radiation absorbing glass substrates are known in the art. The primary colorant in typical green tinted automotive glasses is iron, which is usually present in both the $Fe_2O_3$ and FeO forms. Typical green tinted automotive glass has about 0.5 percent by weight total iron, with the ratio of FeO to total iron being about 0.25. Many glasses use cerium in combination with iron to further control infrared and ultraviolet radiation, for example as disclosed in U.S. Pat. No. 1,637,439 to Coblentz; U.S. Pat. No. 1,936,231 to Gelstharp et al.; and U.S. Pat. No. 2,524,719 to Tillyer. Others also include titanium as disclosed in U.S. Pat. No. 2,444,976 to Brown; U.S. Pat. No. 2,860,059 to Molter et al.; and U.S. Pat. No. 4,792,536 to Pecoraro et al. In particular, U.S. Pat. No. 5,077,133 to Cheng discloses an infrared and ultraviolet absorbing green glass composition that uses iron, cerium and titanium to produce desired color and spectral performance. This patent further discloses that the total amount of iron and cerium as well as the relative amounts of ferric oxide and ferrous oxide are critical to produce the desired glass. U.S. Pat. No. 5,320,986 to Taniguchi; U.S. Pat. No. 5,344,798 to Morimoto et al.; and U.S. Pat. No. 5,362,689 to Morimoto et al. discloses infrared and ultraviolet radiation absorbing glass that includes iron, cerium, titanium and manganese. The manganese is used to control the reduction of the iron in the glass composition and further as a colorant. Chromium has also been used to control ultraviolet transmittance in green glasses. For example, U.S. Pat. No. 2,991,185 to Smith et al. combines chromium, arsenic, and copper oxides. U.S. Pat. No. 2,974,052 to Bacon et al. and U.S. Pat. No. 3,332,790 to Penberthy use chromium in low iron containing glasses to produce glass bottles and containers.

In producing infrared and ultraviolet radiation absorbing glasses, the relative amounts of iron and other additives must be closely monitored and controlled within a narrow operating range to provide the desired color and spectral properties. It would be desirable to have a green glass that may be used for the vision areas of a vehicle, have superior solar performance properties, is compatible with commercial flat glass manufacturing techniques, and provides further means for controlling the glass color without including large amounts of additional materials.

SUMMARY OF THE INVENTION

The present invention provides a green colored glass using a standard soda-lime-silica glass base composition and additionally iron, cerium, chromium and, optionally, titanium as infrared and ultraviolet radiation absorbing materials and colorants. It is preferred that the glass have a green color characterized by a dominant wavelength in the range of about 500 to 565 nanometers with an excitation purity of no higher than about 5% and include about 0.50 to 1.0 wt. % total iron, about 0.26 to 0.65 wt. % $Fe_2O_3$, about 0.05 to 3 wt. % $CeO_2$, 0 to about 2 wt. % $TiO_2$, and about 20 to 650 PPM $Cr_2O_3$. The redox ratio for the glass is maintained between about 0.20 to 0.55.

The glass compositions disclosed in the present invention have an LTA of at least about 65%, preferably at least 70%, a TSUV of no greater than 38%, preferably no greater than 35%, a TSIR of no greater than about 35%, preferably no greater than about 30%, and a TSET of no greater than about 50%, preferably, no greater than about 48%. In addition, the glass preferably has an ISO UV of no greater than about 15%, preferably no greater than about 10%,

DETAILED DESCRIPTION OF THE INVENTION

The base glass of the present invention, that is, the major constituents of the glass without infrared or ultraviolet absorbing materials and/or colorants, which are the object of the present invention, is commercial soda-lime-silica glass characterized as follows:

|  | Weight Percent |
|---|---|
| $SiO_2$ | 66–75 |
| $Na_2O$ | 10–20 |
| CaO | 5–15 |
| MgO | 0–5 |
| $Al_2O_3$ | 0–5 |
| $K_2O$ | 0–5 |

As used herein, all "weight percent (wt. %)" values are based on the total weight of the final glass composition.

To this base glass, the present invention adds infrared and ultraviolet radiation absorbing materials and colorants in the form of iron, cerium, chromium and, optionally, titanium. As disclosed herein, iron is expressed in terms of $Fe_2O_3$ and FeO, cerium is expressed in terms of $CeO_2$, chromium is expressed in terms of $Cr_2O_3$ and titanium is expressed in terms of $TiO_2$. It should be appreciated that the glass compositions disclosed herein may include small amounts of other materials, for example melting and refining aids, tramp materials or impurities. It should be further appreciated that in one embodiment of the invention, small amounts of additional materials may be included in the glass to improve the solar performance of the glass as will be discussed later in more detail.

The iron oxides in a glass composition perform several functions. Ferric oxide, $Fe_2O_3$, is a good ultraviolet radiation absorber and operates as a yellow colorant in the glass. Ferrous oxide, FeO, is a good infrared radiation absorber and operates as a blue colorant. The total amount of iron present in the glasses disclosed herein is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$, the term "$Fe_2O_3$" shall mean iron in the ferric state expressed in terms of $Fe_2O_3$ and the term "FeO" shall mean iron in the ferrous state expressed in terms of FeO.

$CeO_2$ is a strong ultraviolet radiation absorber which in sufficient amounts may impart a slight yellow color to the glass. $TiO_2$ is likewise a strong ultraviolet radiation absorber that also operates as a colorant imparting a yellow color to the glass composition. $Cr_2O_3$ is added to impart a green color to the glass and help control the final glass color. It is believed that the chromium may also provide some ultraviolet radiation absorption. A proper balance between the iron, i.e. ferric and ferrous oxides, cerium, chromium and, optionally, titanium content is required to obtain the desired green-colored glass with the desired spectral properties.

The glass of the present invention may be melted and refined in a continuous, large-scale, commercial melting operation and formed into flat glass sheets of varying thickness by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of about 0.05 to 2 wt. % in the first 5 microns below the surface of the glass that was in contact with the tin. Typical background levels of $SnO_2$ may be as high as 30 parts per million (PPM).

The melting arrangements and forming used to produce the glass composition include, but are not limited to a conventional, overhead fired continuous melting operation, as is well known in the art, or a multi-stage melting operation, as disclosed in U.S. Pat. Nos. 4,381,934 and 4,792,536 to Kunkle et al., U.S. Pat. No. 4,792,536 to Pecoraro et al. and U.S. Pat. No. 4,886,539 to Cerutti et al. If required, a stirring arrangement may be employed within the melting and/or forming stages of the glass production operation to homogenize the glass in order to produce glass of the highest optical quality.

In general, the former operation may be used to produce glass compositions having a redox of up to about 0.40, and the latter operation may be used to produce glass compositions having a redox of about 0.25 and higher, although it is contemplated that either of these operations may produce glass outside these ranges. In particular, a conventional melting operation typically operates at a redox level of up to about 0.35 and preferably at about 0.23–0.30. When producing glass at redox levels in the upper end of this range and higher, additives such as carbon containing material may be added to the batch material to increase the redox level, for example as disclosed in U.S. Pat. No. 4,551,161 to Savolskis et al. Similarly, redox levels below 0.30 may be achieved by the multi-stage operation by increasing the amount of oxidizing constituents in the glass batch and/or modifying the process. For example, manganese oxide may be added to lower the redox level. Redox may also be controlled by adjusting the gas/$O_2$ ratio of the burners.

Tables 1, 2, 3 and 4 illustrate examples of glass compositions which embody the principles of the present invention. The information in Tables 1 and 2 is based on experimental laboratory melts. The information in Table 3 is based on a computer model developed by PPG Industries, Inc. which generates expected optical and spectral properties of a proposed glass composition. The information in Table 4 is based on production glass. The optical and spectral properties shown for Tables 1 and 3 are based on a reference thickness of 0.160 inches (4.06 mm) while those in Table 2 are based on a reference thickness of 0.139 inches (3.53 mm). Table 4 illustrates properties at both thicknesses. Only the iron, cerium, titanium and chromium portions of the examples are listed in the Tables 1–3, while Table 4 also includes the amount of cobalt and manganese present in the production glass. With respect to the transmittance data provided in Tables 1 through 4, the luminous transmittance (LTA) is measured using C.I.E. standard illuminant "A" over the wavelength range 380 to 770 nanometers and glass color, in terms of dominant wavelength and excitation purity, is measured using C.I.E. standard illuminant "C" with a 2° observer, following the procedures established in ASTM E308-90. The ultraviolet transmittance (ISO UV) is based on ISO 9050:1990(E) standards, Section 2.5 (ISO UV) and is measured over a wavelength range of 280 to 380 nanometers. The total solar ultraviolet transmittance (TSUV) is measured over the wavelength range 300 to 400 nanometers, total solar infrared transmittance (TSIR) is measured over the wavelength range 720 to 2000 nanometers, and total solar energy transmittance (TSET) is measured over the wavelength range 300 to 2000 nanometers. The TSUV, TSIR and TSET transmittance data is calculated using Parry Moon air mass 2.0 direct solar irradiance data and integrated using the Trapezoidal Rule, as is known in the art.

The information provided in Tables 1 and 2 is based on experimental laboratory melts having approximately the following basic batch components:

| | |
|---|---|
| sand | 500 gm |
| soda ash | 162.8 gm |
| limestone | 42 gm |
| dolomite | 121 gm |
| salt cake | 2.5 gm |
| rouge | as required |
| $FeO.Cr_2O_3$ | as required |
| $TiO_2$ | as required |
| $CeO_2$ | as required |

Coal was added to each melt to control redox. In preparing the melts, the ingredients were weighed out and blended in a mixer. Half of the material was then placed in a refractory silica crucible and heated to 2650° F. (1454° C.) for 30 minutes. The remaining material was then added to the crucible and heated to 2650° F. (1454° C.) for 1½ hours. Next the molten glass was fritted in water, dried and reheated at 2650° F. (1454° C.) for 1 hour. The molten glass was then fritted a second time in water, dried and reheated to 2650° F. (1454° C.) for 2 hours. The molten glass was then poured out of the crucible and rolled out to a thickness of approximately 0.25 inches (0.635 cm) and annealed. The chemical analysis of the glass compositions was determined using a RIGAKU 3370 X-ray fluorescence spectrophotometer. The FeO content was determined using wet chemistry techniques, as is well known in the art. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties as will be discussed later.

The following is representative of the basic oxides of the glasses disclosed in the tables:

| | Ex. 3–24 Ex. 27–39 | Ex. 1 & 2 Ex. 25 & 26 | Ex. 64 & 65 |
|---|---|---|---|
| $SiO_2$ | 71.5 wt. % | 68.8 wt. % | 72.3 wt. % |
| $Na_2O$ | 12.6 | 12.5 | 13.5 |
| CaO | 8.3 | 8.7 | 8.8 |
| MgO | 3.5 | 3.7 | 3.7 |
| $Al_2O_3$ | 0.13 | 0.1 | 0.14 |
| $K_2O$ | 0.036 | 0.026 | 0.019 |

It is expected that the basic oxide constituents of the computer generated glass compositions in Table 3 would be similar within these ranges.

The examples shown in Tables 1 and 2 included between 25 to 35 parts per million (PPM) $MnO_2$, which is considered to be a tramp and/or residual material level. The compositions in Table 3 were modeled to include 27 PPM $MnO_2$, to better reflect the expected spectral properties of the glass. Table 4 shows the measured $MnO_2$ level in these particular samples. These higher levels are the result of the cullet used in production of the glass. It is expected that this level of manganese may slightly lower LTA and TSUV while slightly increasing dominant wavelength. It is also noted that the cobalt content in Example 65 may slightly lower both LTA and dominant wavelength.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Total Iron (wt. %) | 0.539 | 0.539 | 0.593 | 0.609 | 0.624 | 0.628 | 0.631 | 0.632 | 0.632 | 0.634 | 0.638 | 0.643 |
| $Fe_2O_3$ (wt. %) | 0.315 | 0.377 | 0.406 | 0.402 | 0.417 | 0.352 | 0.411 | 0.370 | 0.436 | 0.441 | 0.458 | 0.443 |
| FeO (wt. %) | 0.202 | 0.146 | 0.168 | 0.186 | 0.186 | 0.248 | 0.198 | 0.236 | 0.176 | 0.174 | 0.162 | 0.180 |
| Redox | 0.375 | 0.271 | 0.283 | 0.305 | 0.298 | 0.395 | 0.314 | 0.373 | 0.278 | 0.274 | 0.254 | 0.280 |
| $CeO_2$ (wt. %) | 2.87 | 2.90 | 1.29 | 1.19 | 1.34 | 1.29 | 1.46 | 1.25 | 1.32 | 1.36 | 1.32 | 1.35 |
| $TiO_2$ (wt. %) | 0.385 | 0.389 | 0.397 | 0.383 | 0.506 | 0.396 | 0.403 | 0.387 | 0.456 | 0.359 | 0.408 | 0.458 |
| $Cr_2O_3$ (PPM) | 50 | 50 | 59 | 47 | 46 | 54 | 48 | 2 | 44 | 45 | 46 | 46 |
| LTA (%) | 69.12 | 69.15 | 72.95 | 72.29 | 71.23 | 68.79 | 71.94 | 69.75 | 72.39 | 72.73 | 73.21 | 71.80 |
| TSUV (%) | 20.51 | 20.14 | 29.76 | 29.84 | 25.78 | 28.45 | 26.72 | 29.02 | 26.49 | 28.46 | 27.25 | 25.98 |
| ISO UV (%) | 5.43 | 5.24 | 10.33 | 10.55 | 8.43 | 9.90 | 8.62 | 10.19 | 8.70 | 9.53 | 8.98 | 8.37 |
| TSIR (%) | 22.47 | 22.90 | 27.69 | 25.33 | 25.51 | 18.41 | 27.22 | 18.83 | 27.02 | 28.06 | 29.75 | 27.05 |
| TSET (%) | 41.38 | 41.59 | 46.51 | 45.01 | 44.31 | 39.63 | 45.60 | 40.49 | 45.69 | 46.55 | 47.57 | 45.40 |
| DW (nm) | 535.7 | 537.6 | 522.3 | 514.5 | 532.9 | 505.8 | 532.7 | 501.7 | 538.1 | 527.1 | 540.7 | 534.2 |
| Pe (%) | 4.25 | 4.43 | 2.73 | 2.67 | 3.53 | 3.72 | 3.43 | 3.91 | 3.75 | 2.90 | 3.79 | 3.55 |

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| Total Iron (wt. %) | 0.643 | 0.644 | 0.649 | 0.665 | 0.655 | 0.666 | 0.668 | 0.719 | 0.724 | 0.739 | 0.798 | 0.811 |
| $Fe_2O_3$ (wt. %) | 0.447 | 0.448 | 0.467 | 0.415 | 0.436 | 0.484 | 0.484 | 0.541 | 0.553 | 0.535 | 0.607 | 0.622 |
| FeO (wt. %) | 0.176 | 0.176 | 0.164 | 0.216 | 0.198 | 0.164 | 0.166 | 0.160 | 0.154 | 0.184 | 0.172 | 0.170 |
| Redox | 0.274 | 0.279 | 0.253 | 0.330 | 0.302 | 0.246 | 0.249 | 0.223 | 0.213 | 0.249 | 0.216 | 0.210 |
| $CeO_2$ (wt. %) | 1.35 | 1.47 | 1.34 | 1.32 | 1.35 | 1.43 | 1.34 | 0.95 | 1.16 | 1.17 | 1.15 | 1.10 |
| $TiO_2$ (wt. %) | 0.410 | 0.407 | 0.404 | 0.314 | 0.408 | 0.197 | 0.312 | 0.266 | 0.214 | 0.214 | 0.188 | 0.014 |
| $Cr_2O_3$ (PPM) | 43 | 51 | 54 | 42 | 59 | 48 | 46 | 74 | 44 | 49 | 45 | 100 |
| LTA (%) | 72.28 | 72.48 | 72.11 | 70.44 | 71.20 | 73.16 | 71.84 | 73.18 | 72.81 | 71.59 | 72.22 | 72.08 |
| TSUV (%) | 26.92 | 26.33 | 26.92 | 28.40 | 26.77 | 30.82 | 28.14 | 30.05 | 28.91 | 28.06 | 28.11 | 30.51 |
| ISO UV (%) | 8.78 | 8.35 | 8.84 | 9.69 | 8.84 | 10.58 | 9.45 | 10.90 | 9.95 | 9.52 | 9.59 | 10.90 |
| TSIR (%) | 27.98 | 29.45 | 28.13 | 22.44 | 25.59 | 29.16 | 26.55 | 31.45 | 29.74 | 25.10 | 28.82 | 29.47 |
| TSET (%) | 46.19 | 47.00 | 46.16 | 42.57 | 44.38 | 47.69 | 45.36 | 48.59 | 47.56 | 44.54 | 46.76 | 47.17 |
| DW (nm) | 532.8 | 539.5 | 534.8 | 511.1 | 529.9 | 515.6 | 521.9 | 533.9 | 529.1 | 522.8 | 534.4 | 526.7 |
| Pe (%) | 3.33 | 3.84 | 3.53 | 2.95 | 3.37 | 2.42 | 2.77 | 3.26 | 2.90 | 2.76 | 3.26 | 2.84 |

TABLE 2

|  | Ex. 25 | Ex. 26 | Ex. 27 | Ex. 28 | Ex. 29 | Ex. 30 | Ex. 31 | Ex. 32 |
|---|---|---|---|---|---|---|---|---|
| Total Iron (wt. %) | 0.539 | 0.539 | 0.624 | 0.628 | 0.632 | 0.632 | 0.636 | 0.639 |
| $Fe_2O_3$ (wt. %) | 0.315 | 0.377 | 0.417 | 0.352 | 0.370 | 0.403 | 0.432 | 0.368 |
| FeO (wt. %) | 0.202 | 0.146 | 0.186 | 0.248 | 0.236 | 0.206 | 0.184 | 0.244 |
| Redox | 0.375 | 0.271 | 0.298 | 0.395 | 0.373 | 0.326 | 0.289 | 0.382 |
| $CeO_2$ (wt. %) | 2.87 | 2.90 | 1.34 | 1.29 | 1.25 | 1.48 | 1.24 | 1.43 |
| $TiO_2$ (wt. %) | 0.385 | 0.389 | 0.506 | 0.396 | 0.387 | 0.405 | 0.387 | 0.305 |
| $Cr_2O_3$ (PPM) | 50 | 50 | 46 | 54 | 2 | 49 | 56 | 45 |
| LTA (%) | 71.69 | 71.71 | 73.59 | 71.37 | 72.24 | 73.22 | 73.72 | 71.72 |
| TSUV (%) | 23.62 | 23.23 | 28.95 | 31.61 | 32.17 | 30.16 | 31.78 | 30.62 |
| ISO UV (%) | 7.17 | 6.93 | 10.28 | 11.82 | 12.13 | 10.65 | 11.82 | 10.98 |
| TSIR (%) | 26.82 | 27.27 | 29.99 | 22.50 | 22.95 | 27.95 | 29.44 | 24.10 |
| TSET (%) | 45.10 | 45.32 | 48.00 | 43.20 | 44.03 | 46.83 | 47.96 | 44.21 |
| DW (nm) | 535.8 | 537.7 | 533.0 | 505.7 | 501.6 | 520.2 | 518.2 | 507.3 |
| Pe (%) | 3.70 | 3.85 | 3.07 | 3.2 | 3.41 | 2.56 | 2.44 | 2.95 |

|  | Ex. 33 | Ex. 34 | Ex. 35 | Ex. 36 | Ex. 37 | Ex. 38 | Ex. 39 |
|---|---|---|---|---|---|---|---|
| Total Iron (wt. %) | 0.640 | 0.640 | 0.645 | 0.655 | 0.656 | 0.668 | 0.683 |
| $Fe_2O_3$ (wt. %) | 0.424 | 0.424 | 0.434 | 0.415 | 0.436 | 0.484 | 0.445 |
| FeO (wt. %) | 0.194 | 0.195 | 0.190 | 0.216 | 0.198 | 0.166 | 0.214 |
| Redox | 0.303 | 0.303 | 0.295 | 0.330 | 0.302 | 0.249 | 0.313 |
| $CeO_2$ (wt. %) | 1.34 | 1.49 | 1.34 | 1.32 | 1.35 | 1.34 | 1.35 |
| $TiO_2$ (wt. %) | 0.409 | 0.409 | 0.458 | 0.314 | 0.408 | 0.312 | 0.360 |
| $Cr_2O_3$ (PPM) | 43 | 56 | 57 | 42 | 59 | 46 | 48 |
| LTA (%) | 73.31 | 73.36 | 73.44 | 72.87 | 73.56 | 74.14 | 71.33 |
| TSUV (%) | 30.18 | 29.79 | 29.05 | 31.54 | 29.91 | 31.27 | 30.24 |
| ISO UV (%) | 10.77 | 10.45 | 10.18 | 11.63 | 10.66 | 11.36 | 10.92 |
| TSIR (%) | 28.61 | 29.03 | 29.82 | 26.79 | 30.07 | 31.06 | 23.50 |

TABLE 2-continued

|  |  |  |  |  |  |  |  |
|---|---|---|---|---|---|---|---|
| TSET (%) | 47.25 | 47.44 | 47.83 | 46.21 | 48.07 | 49.02 | 43.67 |
| DW (nm) | 520.7 | 527.5 | 530.4 | 511.1 | 530.0 | 522.0 | 509.3 |
| Pe (%) | 2.52 | 2.82 | 2.99 | 2.56 | 2.93 | 2.40 | 2.88 |

TABLE 3

|  | Ex. 40 | Ex. 41 | Ex. 42 | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|---|---|
| Total Iron (wt. %) | 0.610 | 0.610 | 0.610 | 0.610 | 0.610 | 0.610 | 0.610 | 0.610 | 0.610 | 0.610 | 0.610 | 0.610 |
| $Fe_2O_3$ (wt. %) | 0.413 | 0.413 | 0.413 | 0.413 | 0.413 | 0.413 | 0.413 | 0.413 | 0.305 | 0.271 | 0.413 | 0.413 |
| FeO (wt. %) | 0.177 | 0.177 | 0.177 | 0.177 | 0.177 | 0.177 | 0.177 | 0.177 | 0.275 | 0.305 | 0.177 | 0.177 |
| Redox | 0.290 | 0.290 | 0.290 | 0.290 | 0.290 | 0.290 | 0.290 | 0.290 | 0.450 | 0.500 | 0.290 | 0.290 |
| $CeO_2$ (wt. %) | 0.1 | 0.3 | 0.5 | 1.27 | 1.27 | 1.7 | 2.05 | 2.5 | 1.27 | 1.27 | 1.27 | 1.27 |
| $TiO_2$ (wt. %) | 0.39 | 0.39 | 0.39 | 1.0 | 1.5 | 0.39 | 0.39 | 0.39 | 0.39 | 0.39 | 0.39 | 0.39 |
| $Cr_2O_3$ (PPM) | 49 | 49 | 49 | 49 | 49 | 49 | 49 | 49 | 49 | 49 | 250 | 450 |
| LTA (%) | 72.87 | 72.82 | 72.77 | 71.55 | 70.75 | 72.46 | 72.37 | 72.26 | 66.83 | 65.15 | 67.70 | 65.09 |
| TSUV (%) | 38.66 | 35.75 | 33.72 | 22.59 | 18.68 | 26.46 | 24.99 | 23.33 | 31.31 | 32.23 | 28.04 | 27.54 |
| ISO UV (%) | 19.60 | 16.19 | 14.09 | 7.14 | 5.61 | 8.07 | 7.09 | 6.07 | 10.79 | 11.20 | 9.57 | 9.56 |
| TSIR (%) | 25.78 | 25.78 | 25.78 | 25.78 | 25.78 | 25.78 | 25.78 | 25.78 | 13.411 | 1.01 | 25.63 | 25.49 |
| TSET (%) | 45.81 | 45.66 | 45.54 | 43.90 | 42.97 | 44.96 | 44.81 | 44.63 | 36.47 | 34.61 | 42.10 | 39.40 |
| DW (nm) | 511.0 | 513.2 | 515.7 | 555.8 | 562.1 | 533.3 | 537.6 | 542.2 | 494.6 | 492.4 | 543.0 | 548.0 |
| Pe (%) | 2.65 | 2.61 | 2.59 | 7.42 | 11.22 | 3.41 | 3.79 | 4.30 | 6.61 | 8.31 | 6.48 | 10.13 |

|  | Ex. 52 | Ex. 53 | Ex. 54 | Ex. 55 | Ex. 56 | Ex. 57 | Ex. 58 | Ex. 59 | Ex. 60 | Ex 61 | Ex. 62 | Ex. 63 |
|---|---|---|---|---|---|---|---|---|---|---|---|---|
| Total Iron (wt. %) | 0.610 | 0.630 | 0.630 | 0.630 | 0.630 | 0.630 | 0.600 | 0.660 | 0.630 | 0.630 | 0.630 | 0.630 |
| $Fe_2O_3$ (wt. %) | 0.413 | 0.434 | 0.434 | 0.434 | 0.454 | 0.413 | 0.413 | 0.454 | 0.434 | 0.434 | 0.434 | 0.434 |
| FeO (wt. %) | 0.177 | 0.176 | 0.176 | 0.176 | 0.158 | 0.195 | 0.168 | 0.185 | 0.176 | 0.176 | 0.176 | 0.176 |
| Redox | 0.290 | 0.280 | 0.280 | 0.280 | 0.250 | 0.310 | 0.280 | 0.280 | 0.280 | 0.280 | 0.280 | 0.280 |
| $CeO_2$ (wt.%) | 1.27 | 1.2 | 1.2 | 1.2 | 1.2 | 1.2 | 1.2 | 1.2 | 1.14 | 1.26 | 1.2 | 1.2 |
| $TiO_2$ (wt. %) | 0.39 | 0.37 | 0.37 | 0.37 | 0.37 | 0.37 | 0.37 | 0.37 | 0.37 | 0.37 | 0.31 | 0.43 |
| $Cr_2O_3$ (PPM) | 640 | 19 | 49 | 79 | 49 | 49 | 49 | 49 | 49 | 49 | 49 | 49 |
| LTA (%) | 59.43 | 73.31 | 72.54 | 71.79 | 73.73 | 71.38 | 73.24 | 71.86 | 72.56 | 72.53 | 72.64 | 72.44 |
| TSUV (%) | 27.09 | 28.73 | 28.65 | 28.57 | 28.15 | 29.17 | 29.16 | 28.15 | 28.98 | 28.33 | 29.32 | 27.99 |
| ISO UV (%) | 9.54 | 9.76 | 9.76 | 9.76 | 9.54 | 9.99 | 9.98 | 9.54 | 10.02 | 9.51 | 10.05 | 9.48 |
| TSIR (%) | 25.36 | 25.89 | 25.86 | 25.84 | 29.47 | 22.73 | 27.40 | 24.42 | 25.86 | 25.86 | 25.86 | 25.86 |
| TSET (%) | 37.10 | 45.68 | 45.19 | 44.72 | 47.55 | 43.09 | 46.35 | 44.09 | 45.22 | 45.17 | 45.32 | 45.06 |
| DW (nm) | 550.1 | 523.0 | 527.8 | 531.6 | 542.3 | 513.1 | 530.6 | 525.0 | 526.9 | 528.6 | 522.0 | 533.0 |
| Pe (%) | 13.61 | 2.60 | 3.04 | 3.52 | 3.98 | 2.82 | 3.09 | 3.00 | 2.98 | 3.09 | 2.74 | 3.40 |

TABLE 4

|  | Ex. 64 |  | Ex. 65 |  |
|---|---|---|---|---|
| Total Iron (wt. %) | 0.624 |  | 0.627 |  |
| $Fe_2O_3$ (wt. %) | 0.435 |  | 0.407 |  |
| FeO (wt. %) | 0.170 |  | 0.198 |  |
| Redox | 0.272 |  | 0.316 |  |
| $CeO_2$ (wt. %) | 0.34 |  | 0.41 |  |
| $TiO_2$ (wt. %) | 0.471 |  | 0.619 |  |
| $Cr_2O_3$ (PPM) | 40 |  | 60 |  |
| CoO (PPM) | <3 |  | 4 |  |
| $MnO_2$ (PPM) | 389 |  | 205 |  |
| Thickness (in.) | 0.139 | 0.160 | 0.139 | 0.160 |
| LTA (%) | 76.11 | 74.04 | 73.58 | 71.22 |
| TSUV (%) | 38.27 | 35.00 | 34.97 | 31.62 |
| ISO UV (%) | 17.63 | 15.34 | 15.53 | 13.32 |
| TSIR (%) | 34.75 | 30.17 | 30.36 | 25.87 |
| TSET (%) | 52.35 | 48.77 | 48.62 | 44.94 |
| DW (nm) | 518.4 | 518.3 | 522.8 | 522.7 |
| Pe (%) | 1.99 | 2.29 | 2.46 | 2.83 |

Referring to Tables 1, 2, 3 and 4, the present invention provides a green colored glass using a standard soda-lime-silica glass base composition and additionally iron, cerium, chromium and, optionally, titanium as infrared and ultraviolet radiation absorbing materials and colorants. As may been seen, not all of the examples are the same green color as indicated by the dominant wavelengths (DW) and excitation purities (Pe). In the present invention, it is preferred that the glass have a green color characterized by a dominant wavelength in the range of about 500 to 565 nanometers with an excitation purity of no higher than about 5%. In various embodiments of the invention, the glass may have a green color characterized by a dominant wavelength in the range of about 500 to 550 nanometers, preferably about 515 to 540 nanometers, and more preferably about 520 to 535 nanometers, with an excitation purity of no higher than about 4%, preferably no higher than about 3%.

In the present invention, the green colored glass includes about 0.50 to 1.0 wt. % total iron, about 0.26 to 0.65 wt. % $Fe_2O_3$, about 0.05 to 3 wt. % $CeO_2$, 0 to about 2 wt. % $TiO_2$, and about 20 to 650 PPM $Cr_2O_3$. In various embodiments of the present invention, the glass includes about 0.6 to 0.8 wt. % total iron, preferably about 0.6 to 0.7 wt. %; about 0.35 to 0.65 wt. % $Fe_2O_3$, preferably about 0.4 to 0.5 wt. %, and more preferably less than about 0.48 wt. %; about 0.8 to 1.5 wt. % $CeO_2$, preferably about 0.9 to 1.4 wt. % and more preferably about 1.0 to 1.3 wt. %; 0 to about 0.7 wt. % $TiO_2$, preferably about 0.2 to 0.6 wt. % and more preferably about 0.3 to 0.5 wt. %; and about 20 to 150 PPM $Cr_2O_3$, preferably about 40 to 90 PPM and more preferably about 40 to 75 PPM.

The redox ratio for the glass of the present invention is maintained between about 0.20 to 0.55. In various embodiments of the invention, the redox ratio for the glass is maintained between about 0.20 to 0.40 preferably between about 0.267 to 0.35, and more preferably about 0.27 to 0.31.

The glass compositions disclosed in the present invention have an LTA of at least about 65%, preferably at least 70%, a TSUV of no greater than 38%, preferably no greater than 35%, a TSIR of no greater than about 35%, preferably no greater than about 30%, and a TSET of no greater than about 50%, preferably, no greater than about 48%. In addition, the glass preferably has an ISO UV of no greater than about 15%, preferably no greater than about 10%, It is expected that reducing glass thickness will increase its LTA, TSUV, ISO UV, TSIR and TSET. While having a higher LTA may be beneficial with respect to providing better vision through the glass, this is not desirable with respect to the remaining properties; however even with thinner glass, compositions as disclosed herein may provide optical and spectral performance as discussed above. For example, at a thickness of 0.125 inches (3.175 mm), it is expected that the compositions disclosed as Examples 1 and 2 in Table 1 (which also correspond to Examples 25 and 26 in Table 2) would have the following properties:

|  | Ex. 1 | Ex. 2 |
| --- | --- | --- |
| LTA (%) | 73.46 | 73.48 |
| TSUV (%) | 26.07 | 25.67 |
| ISO UV (%) | 8.73 | 8.46 |
| TSIR (%) | 30.22 | 30.68 |
| TSET (%) | 47.90 | 48.12 |

It is preferred that for thin glass, and in particular for glass having a thickness of 0.125 inches or less, the glass composition include about 0.5 to 0.7 wt. % total iron and about 1.3 to 2.5 wt. % $CeO_2$, and preferably 1.5 to 2 wt. % $CeO_2$.

It is expected that the spectral properties of the glass will change after tempering the glass and further upon prolonged exposure to ultraviolet radiation, commonly referred to as solarization. In particular, it is estimated that tempering and solarization of the glass compositions disclosed herein will reduce LTA by about 1.5 to 2%, reduce the TSUV, ISO UV and TSIR by about 2 to 3%, and reduce TSET by about 1 to 2.5%. As a result, in one embodiment of the invention, the glass composition has selected spectral properties that initially fall outside the desired ranges previously discussed but fall within the desired ranges after tempering and/or solarization. For example, it is anticipated that the glass compositions disclosed in Examples 27–39 of Table 2 will have an ISO UV of less than 10% after tempering and solarization.

It should also be appreciated that the luminous transmittance also is reduced by these conditions. As a result, in order to maintain the luminous transmittance above a desired minimum level, and in particular greater than 70%, the initial LTA of the glass after production should be sufficiently high so that any loses attributable to tempering and solarization will not reduce the luminous transmittance to an unacceptable level.

Based on the above, for annealed glass prior to tempering and/or solarization, the glass compositions of the present invention should have a luminous transmittance of at least about 71.5%, preferably at least 72%, a TSUV of no greater than 40%, preferably no greater than 37%, a TSIR of no greater than about 37%, preferably no greater than about 32%, and a TSET of no greater than about 51%, preferably, no greater than about 49%. Furthermore, the glass preferably has an ISO UV of no greater than about 17%, preferably no greater than about 12%, Referring to Table 3, it may be seen that the relative amount of chromium in the glass composition has a greater effect on the glass color than the iron, cerium or titanium. In particular as shown in Examples 53, 54 and 55, varying the $Cr_2O_3$ from 19 to 79 PPM changed the dominant wavelength by almost 10 nm. This may be compared to Examples 58, 54,
and 59 where the total iron was varied from 0.6 to 0.66 wt. % (a difference of 600 PPM) producing a change in the dominant wavelength of about 5 nm and Examples 60, 54, and 61 where the $CeO_2$ was varied from 1.14 to 1.26 wt. % (a difference of 1200 PPM) producing a change in the dominant wavelength of less than 2 nm. In Examples 62, 54, and 63, the $TiO_2$ level was varied from 0.31 to 0.43 wt. % and the dominant wavelength changed by about 11 nm. However, it is noted that this change in dominant wavelength was accompanied by a 1200 PPM variation in the $TiO_2$ content while a comparable change was effected by using a much smaller amount of $Cr_2O_3$, and in particular 60 PPM (which is 1/20 of the amount of $TiO_2$ used).

With respect to chromium content, the inclusion of $Cr_2O_3$ as a colorant generally tends to reduce the luminous transmittance of the glass; however it is believed that higher levels of $Cr_2O_3$, and in particular up to about 650 PPM $Cr_2O_3$, may be included in thin glass while still maintaining a luminous transmittance of at least 65%. For example, using the computer model discussed earlier, it is expected that Example 52 in Table 3 will have approximately the following properties at a thickness of 0.125 inches: LTA=65.13%, TSUV=32.43%, ISO UV=12.45%, TSIR=33.34%, TSET=44.43%.

Glass made by the float process typically ranges from a sheet thickness of about 1 millimeters to 10 millimeters. For the vehicle glazing applications, it is preferred that the glass sheets having a composition as disclosed herein have a thickness within the range of 0.071 to 0.197 inches (1.8 to 5 mm). It is anticipated that when using a single glass ply, the glass will be tempered, e.g. for an automotive side or rear window, and when multiple plies are used, the glass will be annealed and laminated together using a thermoplastic adhesive, e.g. an automobile windshield which laminates two annealed glass plies together using polyvinyl butyral.

As discussed earlier, other materials may also be added to the glass compositions disclosed herein to further reduce infrared and ultraviolet radiation transmission and/or control glass color. In particular, it is contemplated that the following materials may be added to the iron, cerium, titanium and chromium containing soda-lime-silica glass disclosed herein:

| $MnO_2$ | 0 to about 0.5 wt. % |
| --- | --- |
| $SnO_2$ | 0 to about 2.0 wt. % |
| ZnO | 0 to about 0.5 wt. % |
| Mo | 0 to about 0.015 wt. % |
| $V_2O_5$ | 0 to about 0.04 wt. % |
| Se | 0 to about 3 PPM |
| CoO | 0 to about 5 PPM |

As should be appreciated, adjustment may have to be made to the basic iron, cerium, chromium and/or titanium constituents to account for any coloring and/or redox affecting power of these additional materials.

Other variations as are known to those of skill in the art may be resorted to without departing from the scope of the invention as defined by the claims that follow.

We claim:

1. A green colored infrared and ultraviolet radiation absorbing glass composition comprising about 66 to 75 percent by weight $SiO_2$, about 10 to 20 percent by weight $Na_2O$, about 5 to 15 percent by weight CaO, 0 to about 5 percent by weight MgO, 0 to about 5 percent by weight $Al_2O_3$, 0 to about 5 percent by weight $K_2O$, about 0.50 to 1 percent by weight total iron, about 0.26 to 0.65 percent by weight $Fe_2O_3$, about 0.05 to 3 percent by weight $CeO_2$, 0 to about 2 percent by weight $TiO_2$, and about 20 to 650 PPM $Cr_2O_3$, wherein the glass has a luminous transmittance (LTA) of about 65 percent or greater, and a color characterized by a dominant wavelength in the range of 515 to 565 nanometers.

2. The composition as in claim 1 wherein the $Fe_2O_3$ content is about 0.35 to 0.65 percent by weight, the $CeO_2$ concentration is about 0.8 to 1.5 percent by weight, the $TiO_2$ concentration is 0 to about 0.7 percent by weight, and the $Cr_2O_3$ concentration is about 20 to 150 PPM.

3. The composition as in claim 2 wherein the total iron concentration is from about 0.6 to 0.8, the $Fe_2O_3$ concentration is from about 0.4 to 0.5 weight percent, the $CeO_2$ concentration is from about 0.9 to 1.4 weight percent, the $TiO_2$ concentration is from about 0.2 to 0.6 weight percent and the $Cr_2O_3$ concentration is from about 40 to 75 PPM, and further wherein the glass has a luminous transmittance (LTA) of about 70 percent or greater, a total solar ultraviolet transmittance (TSUV) of no greater than 38 percent, and a color further characterized by and an excitation purity of no higher than about 5%.

4. The composition as in claim 3 wherein the $Fe_2O_3$ concentration is less than 0.48 weight percent and the glass has a redox of 0.27 or greater.

5. The composition as in claim 1 wherein the total iron concentration is about 0.5 to 0.7 percent by weight and the $CeO_2$ concentration is about 1.3 to 2.5 percent by weight.

6. The composition as in claim 5 wherein the $CeO_2$ concentration is about 1.5 to 2 percent by weight.

7. The composition as in claim 1 wherein the glass has a total solar infrared transmittance (TSIR) of about 35 percent or less, a total solar energy transmittance (TSET) is about 65 percent or less, and an ultraviolet transmittance (ISO UV) of about 15 percent or less.

8. The composition as in claim 7 wherein the glass has a luminous transmittance (LTA) of about 71.5 percent or greater and an ultraviolet transmittance (ISO UV) of about 12 percent or less.

9. The composition as in claim 7 wherein the glass has an ultraviolet transmittance (ISO UV) of about 10 percent or less.

10. The composition as in claim 7 wherein the color of the glass is characterized by a dominant wavelength in the range of 515 to 540 nanometers and an excitation purity of no higher than about 3%.

11. The composition as in claim 1 wherein the composition is in the form of a glass sheet.

12. A green colored, infrared and ultraviolet radiation absorbing glass composition having a base glass portion comprising:

| | |
|---|---|
| $SiO_2$ | about 66 to 75 percent by weight |
| $Na_2O$ | about 10 to 20 percent by weight |
| CaO | about 5 to 15 percent by weight |
| MgO | 0 to about 5 percent by weight |
| $Al_2O_3$ | 0 to about 5 percent by weight |
| $K_2O$ | 0 to about 5 percent by weight | and a solar radiation absorbing and colorant portion consisting essentially of:

total iron about 0.50 to 1 percent by weight
$Fe_2O_3$ about 0.26 to 0.65 percent by weight
$CeO_2$ about 0.05 to 3 percent by weight
$TiO_2$ 0 to about 2 percent by weight
$Cr_2O_3$ about 20 to 650 PPM, the glass having a luminous transmittance (LTA) of about 65 percent or greater and a total solar ultraviolet transmittance (TSUV) of about 38 percent or less, and a color characterized by a dominant wavelength in the range of 515 to 565 nanometers.

13. The composition as in claim 12 wherein the $Fe_2O_3$ content is about 0.35 to 0.65 percent by weight, the $CeO_2$ concentration is about 0.8 to 1.5 percent by weight, the $TiO_2$ concentration is 0 to about 0.7 percent by weight, and the $Cr_2O_3$ concentration is about 20 to 150 PPM.

14. The composition as in claim 13 wherein the total iron concentration is from about 0.6 to 0.8 weight percent and the $Fe_2O_3$ concentration is from about 0.4 to 0.5 weight percent.

15. The composition as in claim 14 wherein the $CeO_2$ concentration is from about 0.9 to 1.4 weight percent, the $TiO_2$ concentration is from about 0.2 to 0.6 weight percent and the $Cr_2O_3$ concentration is from about 40 to 75 PPM.

16. The composition as in claim 15 wherein the total iron concentration is from about 0.6 to 0.7, the $Fe_2O_3$ concentration is less than 0.48 weight percent, the $CeO_2$ concentration is from about 1 to 1.3 weight percent, the $TiO_2$ concentration is from about 0.3 to 0.5 weight percent and the $Cr_2O_3$ concentration is from about 40 to 60 PPM.

17. The composition as in claim 15 wherein the $Fe_2O_3$ concentration is less than 0.48 weight percent and the glass has a redox of 0.27 or greater.

18. The composition as in claim 15 wherein the glass has a luminous transmittance (LTA) of about 70 percent or greater and an ultraviolet transmittance (ISO UV) of no greater than about 15 percent.

19. The composition as in claim 18 wherein the glass has a luminous transmittance (LTA) of about 71.5 percent or greater and an ultraviolet transmittance (ISO UV) of about 12 percent or less.

20. The composition as in claim 18 wherein the glass has an ultraviolet transmittance (ISO UV) of no greater than about 10 percent.

21. The composition as in claim 18 wherein the glass has a total solar infrared transmittance (TSIR) of about 35 percent or less and a total solar energy transmittance (TSET) is about 65 percent or less.

22. The composition as in claim 18 wherein the color of the glass is further characterized by an excitation purity of no higher than about 5%.

23. The composition as in claim 22 wherein the color of the glass is characterized by a dominant wavelength in the range of 515 to 540 nanometers and an excitation purity of no higher than about 4%.

24. The composition as in claim 22 wherein the composition is in the form of a glass sheet.

25. The composition as in claim 24 wherein said sheet has a thickness between 1.8 to 5 mm.

26. The composition as in claim 12 wherein the total iron concentration is about 0.5 to 0.7 percent by weight and the $CeO_2$ concentration is about 1.3 to 2.5 percent by weight.

27. The composition as in claim 26 wherein the $CeO_2$ concentration is about 1.5 to 2 percent by weight.

28. The composition as in claim 12 wherein the composition is in the form of a glass sheet.

29. A green colored, infrared and ultraviolet radiation absorbing glass composition having a base glass portion comprising:

| | |
|---|---|
| $SiO_2$ | about 66 to 75 percent by weight |
| $Na_2O$ | about 10 to 20 percent by weight |
| CaO | about 5 to 15 percent by weight |
| MgO | 0 to about 5 percent by weight |
| $Al_2O_3$ | 0 to about 5 percent by weight |
| $K_2O$ | 0 to about 5 percent by weight | and a solar radiation absorbing and colorant portion consisting essentially of:

| | |
|---|---|
| $Fe_2O_3$ | about 0.36 up to but less than 0.48 percent by weight |
| $CeO_2$ | about 0.05 to 3 percent by weight |
| $TiO_2$ | 0 to about 2 percent by weight |
| $Cr_2O_3$ | about 20 to 650 PPM, | the glass having a redox of 0.27 or greater, a luminous transmittance (LTA) of about 65 percent or greater and a total solar ultraviolet transmittance (TSUV) of about 38 percent or less, wherein the color of the glass is characterized by a dominant wavelength in the range of about 500 to 565 nanometers.

30. The composition as in claim 29 wherein the $CeO_2$ concentration is about 0.8 to 1.5 percent by weight, the $TiO_2$ concentration is 0 to about 0.7 percent by weight, and the $Cr_2O_3$ concentration is about 20 to 150 PPM, and the color of the glass is characterized by a dominant wavelength in the range of about 515 to 540 nanometers.

31. The composition as in claim 30 wherein the color of the glass is characterized by a dominant wavelength in the range of about 520 to 535 nanometers and an excitation purity of about 4% or less.

32. The composition as in claim 30 wherein the $CeO_2$ concentration is from about 0.9 to 1.4 weight percent, the $TiO_2$ concentration is from about 0.2 to 0.6 weight percent and the $Cr_2O_3$ concentration is from about 40 to 75 PPM.

33. The composition as in claim 32 wherein the $CeO_2$ concentration is from about 1 to 1.3 weight percent, the $TiO_2$ concentration is from about 0.3 to 0.5 weight percent and the $Cr_2O_3$ concentration is from about 40 to 60 PPM.

34. The composition as in claim 32 wherein the glass has a luminous transmittance (LTA) of about 70 percent or greater, a total solar infrared transmittance (TSIR) of about 35 percent or less and a total solar energy transmittance (TSET) of about 65 percent or less.

35. The composition as in claim 34 wherein the glass has a luminous transmittance (LTA) of about 71.5 percent or greater and an ultraviolet transmittance (ISO UV) of about 12 percent or less.

36. The composition as in claim 34 wherein the glass has an ultraviolet transmittance (ISO UV) of about 15 percent or less.

37. The composition as in claim 36 wherein the glass has an ultraviolet transmittance (ISO UV) of about 10 percent or less.

38. The composition as in claim 29 wherein the total iron concentration is about 0.5 to 0.7 percent by weight and the $CeO_2$ concentration is about 1.3 to 2.5 percent by weight.

39. The composition as in claim 38 wherein the $CeO_2$ concentration is about 1.5 to 2 percent by weight.

40. The composition as in claim 38 wherein the glass has a luminous transmittance (LTA) of about 70 percent or greater, a total solar infrared transmittance (TSIR) of about 35 percent or less and a total solar energy transmittance (TSET) of about 65 percent or less.

41. The composition as in claim 29 wherein the composition is in the form of a glass sheet.

42. A green colored, infrared and ultraviolet radiation absorbing glass composition having a base glass portion comprising:

| | |
|---|---|
| $SiO_2$ | about 66 to 75 percent by weight |
| $Na_2O$ | about 10 to 20 percent by weight |
| CaO | about 5 to 15 percent by weight |
| MgO | 0 to about 5 percent by weight |
| $Al_2O_3$ | 0 to about 5 percent by weight |
| $K_2O$ | 0 to about 5 percent by weight | and a solar radiation absorbing and colorant portion consisting essentially of:

| | |
|---|---|
| total iron | about 0.50 to 1 percent by weight |
| $Fe_2O_3$ | about 0.26 to 0.65 percent by weight |
| $CeO_2$ | about 0.05 to 3 percent by weight |
| $Cr_2O_3$ | about 20 to 650 PPM, |
| $TiO_2$ | 0 to about 2 percent by weight |
| $MnO_2$ | 0 to about 0.5 percent by weight |
| $SnO_2$ | 0 to about 2.0 percent by weight |
| ZnO | 0 to about 0.5 percent by weight |
| Mo | 0 to about 0.015 percent by weight |
| $V_2O_5$ | 0 to about 0.04 percent by weight |
| Se | 0 to about 3 PPM |
| CoO | 0 to about 5 PPM | the glass having a luminous transmittance (LTA) of about 65 percent or greater and a total solar ultraviolet transmittance (TSUV) of 38 percent or less, and a color characterized by a dominant wavelength in the range of 515 to 565 nanometers.

43. The composition as in claim 42 wherein the glass has a luminous transmittance (LTA) of about 70 percent or greater, an ultraviolet transmittance (ISO UV) of about 15 percent or less, a total solar infrared transmittance (TSIR) of about 35 percent or less and a total solar energy transmittance (TSET) of about 65 percent or less, and a color further characterized by an excitation purity of about 5% or less.

44. The composition as in claim 43 wherein the $Fe_2O_3$ content is about 0.35 to 0.65 percent by weight, the $CeO_2$ concentration is about 0.8 to 1.5 percent by weight, the $TiO_2$ concentration is 0 to about 0.7 percent by weight, and the $Cr_2O_3$ concentration is about 20 to 150 PPM.

45. The composition as in claim 43 wherein the glass composition has a redox of 0.27 or greater and an $Fe_2O_3$ concentration of less than 0.48 wt. % and the color of the glass is characterized by a dominant wavelength in the range of about 515 to 540 nanometers and an excitation purity of about 4% or less.

46. The composition as in claim 43 wherein the total iron concentration is about 0.5 to 0.7 percent by weight and the $CeO_2$ concentration is about 1.3 to 2.5 percent by weight.

47. The composition as in claim 46 wherein the $CeO_2$ concentration is about 1.5 to 2 percent by weight.

48. A green colored, infrared and ultraviolet radiation absorbing glass composition having a base glass portion comprising:

| | |
|---|---|
| $SiO_2$ | about 66 to 75 percent by weight |
| $Na_2O$ | about 10 to 20 percent by weight |
| CaO | about 5 to 15 percent by weight |
| MgO | 0 to about 5 percent by weight |
| $Al_2O_3$ | 0 to about 5 percent by weight |
| $K_2O$ | 0 to about 5 percent by weight | and a solar radiation absorbing and colorant portion consisting essentially of:

total iron about 0.5 up to but less than 0.7 percent by weight

| | |
|---|---|
| Fe$_2$O$_3$ | about 0.36 up to but less than 0.48 percent by weight |
| CeO$_2$ | about 0.05 to 3 percent by weight |
| TiO$_2$ | 0 to about 2 percent by weight |
| Cr$_2$O$_3$ | about 20 to 650 PPM, | the glass having a redox of 0.27 or greater, a luminous transmittance (LTA) of about 65 percent or greater and a total solar ultraviolet transmittance (TSUV) of about 38 percent or less.

49. A green colored infrared and ultraviolet radiation absorbing glass composition comprising about 66 to 75 percent by weight SiO$_2$, about 10 to 20 percent by weight Na$_2$O, about 5 to 15 percent by weight CaO, 0 to about 5 percent by weight MgO, 0 to about 5 percent by weight Al$_2$O$_3$, 0 to about 5 percent by weight K$_2$O, about 0.50 to 1 percent by weight total iron, about 0.26 to 0.65 percent by weight Fe$_2$O$_3$, about 0.05 to 3 percent by weight CeO$_2$, 0 to about 2 percent by weight TiO$_2$, and greater than 400 up to about 650 PPM Cr$_2$O$_3$, wherein the glass has a luminous transmittance (LTA) of about 65 percent or greater.

50. The composition as recited in claim 49 wherein the Cr$_2$O$_3$ content is about 450 to 650 PPM, and the glass has a color characterized by a dominant wavelength in the range of 515 to 565 nanometers.

* * * * *